United States Patent [19]
Boyd et al.

[11] Patent Number: 5,873,569
[45] Date of Patent: *Feb. 23, 1999

[54] WORKPIECE POSITIONER

[75] Inventors: Douglas K. Boyd, Colona, Ill.; Michael J. McCreary, Davenport; Christopher J. Schilb, Bettendorf, both of Iowa

[73] Assignee: Genesis Systems Group, Davenport, Iowa

[ * ] Notice: This patent issued on a continued prosecution application filed under 37 CFR 1.53(d), and is subject to the twenty year patent term provisions of 35 U.S.C. 154(a)(2).

[21] Appl. No.: 758,486

[22] Filed: Nov. 29, 1996

Related U.S. Application Data

[63] Continuation of Ser. No. 431,109, Apr. 28, 1995, abandoned, which is a continuation of Ser. No. 184,018, Jan. 21, 1994, abandoned.

[51] Int. Cl.$^6$ ...................................................... B25B 1/20
[52] U.S. Cl. .............................. 269/43; 269/71; 269/296; 269/61
[58] Field of Search ..................................... 414/736, 735, 414/680, 225; 269/56, 57, 58, 60, 61, 71, 88, 296, 43, 114, 113, 73; 82/129; 144/286 A; 29/38 A, 38 B; 409/165, 168, 219, 224, 221

[56] References Cited

U.S. PATENT DOCUMENTS

| | | |
|---|---|---|
| 324,276 | 8/1885 | Scribner ................................. 269/114 |
| 1,481,503 | 1/1924 | Carswell et al. .......................... 269/60 |
| 1,587,682 | 6/1926 | Siegfried et al. ........................ 269/114 |
| 1,812,585 | 6/1931 | Collins ..................................... 269/60 |
| 1,823,204 | 9/1931 | Long ......................................... 269/73 |
| 1,833,329 | 11/1931 | Packer ..................................... 29/38 A |
| 2,399,824 | 5/1946 | Pressman ................................. 269/113 |
| 2,568,233 | 9/1951 | Hamilton .................................. 269/43 |
| 4,828,241 | 5/1989 | Yang ....................................... 269/114 |

*Primary Examiner*—Robert C. Watson
*Attorney, Agent, or Firm*—Zarley, McKee, Thomte, Voorhees & Sease

[57] ABSTRACT

The invention relates to a workpiece positioner and assembly therefore which optimizes workpiece rotation for manufacturing processes, and specifically for use with an industrial robot. In general, the workpiece positioner assembly is supported on a base. The workpiece positioner assembly is rectangular in shape and includes drive arms and idler arms between which workpieces are supported. Due to the unique shape of the workpiece positioner assembly, the workpiece-to-workpiece rotational clearance can be reduced to zero due in part to the position of cross tubing from the drive end of the workpiece positioner assembly to the idler end of the workpiece positioner assembly. The cross tubing does not interfere with the workpiece rotational area thereby allowing workpiece size and orientation to be increased without affecting positioner swing or operation height.

8 Claims, 3 Drawing Sheets

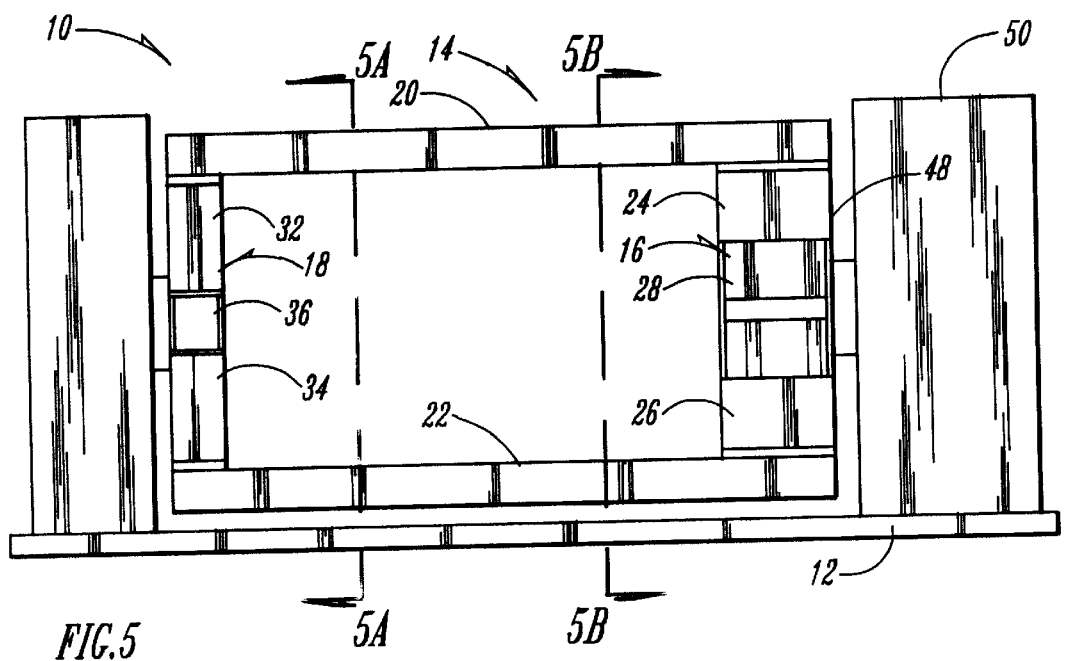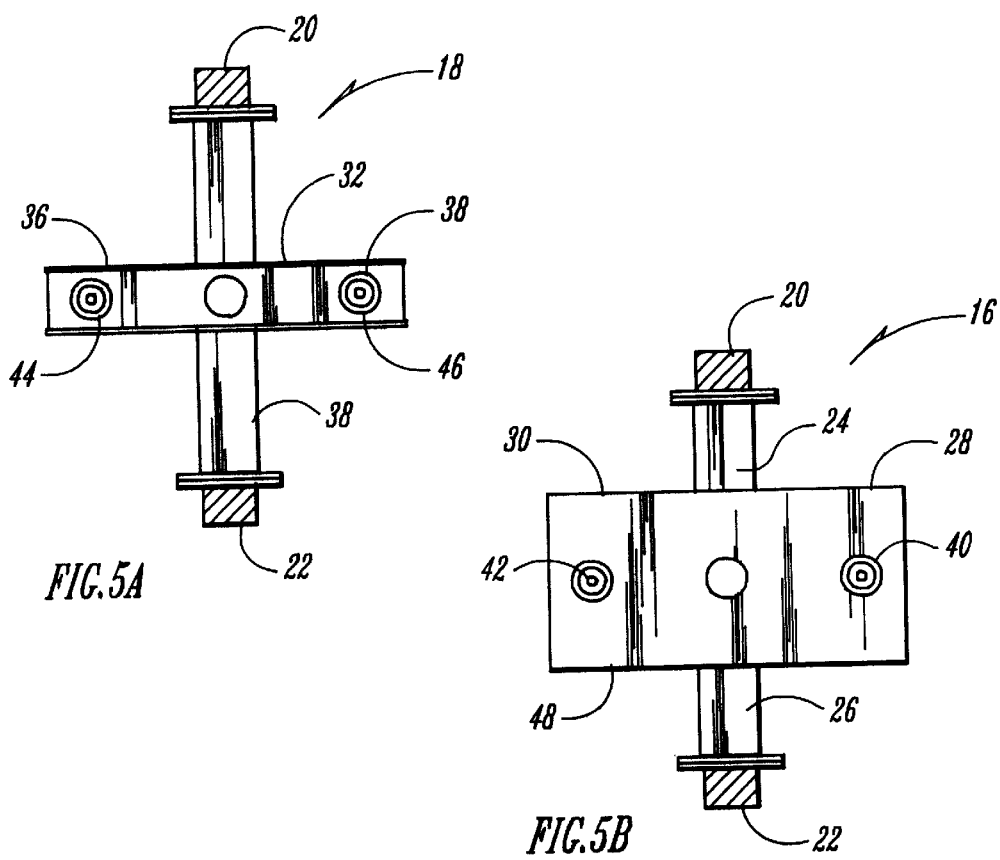

WORKPIECE POSITIONER

This is a continuation of application Ser. No. 08/431,109 filed on Apr. 28, 1995 now abandoned, which is a continuation of application Ser. No. 08/184,018 filed Jan. 1, 1994 now abandoned.

BACKGROUND OF THE INVENTION

This invention relates to a device for moving workpieces to predetermined positions with respect to an industrial robot for automated manufacturing operations.

This invention specifically improves upon the traditional positioner design currently employed by those in the prior art. A typical workpiece positioner includes an H-shaped frame structure having a plurality of fixture supports. These devices are generally known as "exchange-axis positioners", "three-axis tables" or "Ferris-wheel positioners". The Ferris-wheel positioner and the three-axis table are the two most typical styles currently used.

As shown in U.S. Pat. Nos. 5,074,741 and 4,666,363, issued to Johansson, the traditional Ferris-wheel table operates about three axes. The workpieces are supported between the legs of the H-shaped frame structure and can be rotated around two independent horizontal axes. The H-shaped frame structure itself rotates about a similar horizontal axis. The three-axis table also rotates the workpieces about horizontal axes, and rotates the H-shaped frame structure about a vertical axis generally perpendicular to the plane of the H-shaped structure.

Several problems with these traditional types of positioners occur when workpieces sizes approach the maximum work envelope of most industrial robots. For example, in the Ferris-wheel positioner, floor clearance determines the maximum size of the workpiece that can be turned. As the workpiece gets larger, more floor clearance is required to allow the bigger piece to turn about the horizontal axis which runs axially along the H-shaped frame structure. As floor clearance gets larger, the center line of rotation, or third axis (exchange axis), gets higher and, resultantly, puts the station load height, or robot operation height, or both, inconveniently high.

In the three-axis table positioners, robot clearance is required to allow the positioner to turn about its vertical axis. As the workpiece gets larger, more robot clearance and distance from the table is required to allow the bigger piece to turn. As robot clearance increases, the proximity of the robot to the ultimate position of the workpiece is compromised. This imposes the additional requirement that the robot must either be moved during the turning of the positioner or forego optimum reach on the workpiece.

In both positioner styles, the speed of the axis exchange must always be compromised as part sizes and weights go up. This is because of the extreme distance of each workpiece axis from the center line of exchange axis or rotation.

SUMMARY OF THE INVENTION

Therefore, a primary object of the present invention is the provision of an improved workpiece positioner.

A further object of the present invention is the provision of an improved workpiece positioner which requires near zero clearance between the workpiece rotation diameter and the industrial robot.

A further object of the present invention is the provision of an improved workpiece positioner which can accommodate a greater range of workpiece size and weight.

A still further object of the present invention is the provision of an improved workpiece positioner which allows a more efficient use of space.

A further object of the present invention is the provision of an improved workpiece positioner which is economical, efficient in use, and which results in a durable assembly.

The present invention utilizes a base, a workpiece positioner assembly supported for rotational movement with respect to said base, and workpiece support means attached to said workpiece positioner assembly. The workpiece positioner assembly is rotated about a horizontal axis by a drive means. The workpiece support means are also rotated about a horizontal axis by the workpiece drive means. The workpiece-to-workpiece rotational clearance can be near zero due to the orientation of the cross tubes located on the perimeter of the workpiece rotational area. Generally, the workpiece positioner assembly is rectangular in shape. The drive end and idler end of the workpiece positioner assembly are shaped like a cross. Two opposite ends of the cross bear the workpiece drive means and workpiece idler means respectively while cross tubes extend from the remaining two arms of the cross.

When the work piece positioner assembly is fully loaded, the workpieces are free to rotate between the workpiece drive supports and the workpiece idler supports and, while in position, no section of the workpiece positioner assembly exists there between. This allows the workpiece-to-workpiece clearance to be practically zero while allowing a single drive means to rotate both the drive end and the idler end of the workpiece positioner assembly. This allows optimization of systems by decreasing required operating heights, reducing the movement about the workpiece positional assembly axis due to workpiece weight, thereby permitting optimum axis speed, and reducing the swing radius of the workpiece positioner assembly.

DESCRIPTION OF THE DRAWINGS

FIG. 5 is an elevational view of the workpiece positioner.

FIG. 5A is a view taken along line 5A—5A of FIG. 5.

FIG. 5B is a view taken along line 5B—5B of FIG. 5.

DETAILED DESCRIPTION OF THE PREFERRED EMBODIMENT

Figure 1:
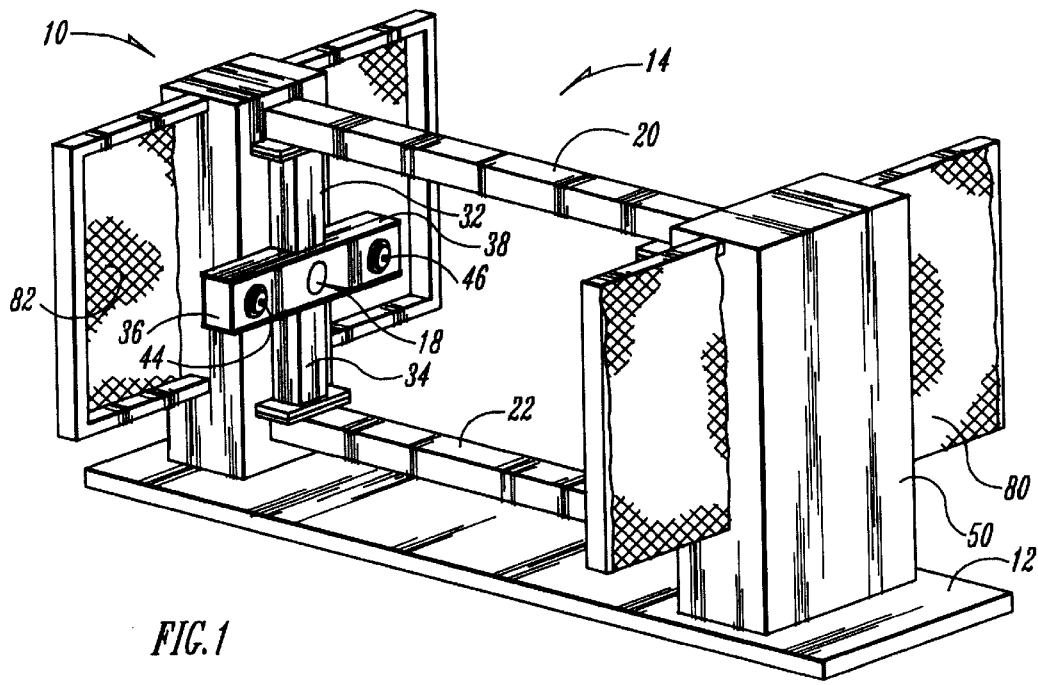
FIG. 1 is a perspective view of an assembled workpiece positioner.
Figure 2:
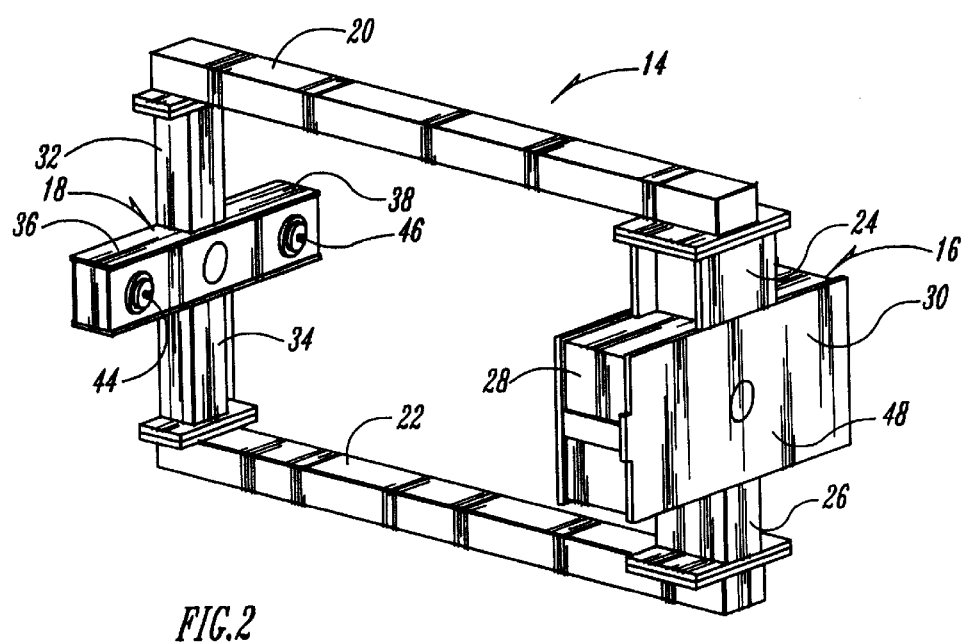
FIG. 2 is an isolated perspective view of the workpiece positioner assembly without the base.

Referring to the drawings, numeral 10 generally refers to the workpiece positioner of the present invention which comprises a base 12 and a workpiece positioner assembly 14. The workpiece positioner assembly 14 has a headstock drive end section 16 and a tailstock idler end section 18 with upper and lower cross tubes or tie bars 20, 22 extending there between. These tie bars serve as rotating means, wherein the rotation of drive end section 16 is imparted to idler end section 18. The drive end 16 and idler end 18 of the workpiece positioner assembly 14 are generally cross-shaped. The drive end 16 of the workpiece positioner assembly 14 has an upper support arm 24, a lower support arm 26, a first drive arm 28 and a second drive arm 30. The idler end 18 of the workpiece positioner assembly 14 has an upper support 32 corresponding to the upper support arm 24, a lower support arm 34 corresponding to the lower support arm 26, a first idler arm 36 corresponding to the first drive arm 28 and a second idler arm 38 corresponding to the second drive arm 30. The upper tie bar 20 extends from the upper support arm 24 to upper support arm 32. The lower tie bar 22 extends from lower support arm 26 to lower support arm 34.

Workpieces are generally positioned between the drive end 16 and idler end 18 of the workpiece positioner assembly 14. The present invention is designed to support two workpieces up to seventy-two inches (72") in length and thirty-six inches (36") in diameter simultaneously. A single workpiece may be inserted up to forty-six inches (46"). However, many different orientations are possible. A first workpiece will be supported at one end by the first workpiece drive support 40 and at its second end by the first workpiece idler support 44. A second workpiece can be supported by the second workpiece drive support 42 at one end and by the second workpiece idler support 46 at the other. Any means known in the art for attaching the workpiece between said supports 40, 42, 44, 46 would be within the scope of the invention.

Arm housing 48 adjacent the first and second drive arms 28, 30 houses the driving mechanisms for rotating the workpiece. The workpieces are rotated about an axis (workpiece axis) generally parallel to the tie bars 20, 22 of the first embodiment. An independent and distinct driving means is operatively connected to both the first and second workpiece drive supports 40, 42 for independent and simultaneous rotation of workpieces supported therein. When the drive supports 40, 42 are rotated, the idler supports 44, 46 allow the workpiece to rotate without imparting significant torque or twisting force.

The workpiece positioner assembly drive means (not shown) as well as other mechanical components such as gear boxes and reducers are located within main casing 50. The workpiece positioner assembly drive means rotates the workpiece positioner assembly 14 about a horizontal axis substantially parallel to tie bars 20, 22 and the workpiece axis. These electric motors can be found in the existing art. One such example is the CAMCO 601 90 Volt DC Motor, a one-third horsepower motor which is coupled to a 50:1 ratio gear reducer manufactured by CONE DRIVE, a MSHV size 40 having 2.1875 bore inches and a 182TC–184TC motor adapter.

A robot 52 having an implement supporting arm 54 is of a type known in the art. The detailed design of the robot 52 and its presence at all is irrelevant to the invention. Typically, however, the robot 52 is operated according to a predetermined program adapted to the workpiece in question. Typically, the implement arm 54 contains a welding apparatus used to perform operation on the workpiece. However, these functions are well known in the art.

Figure 3:
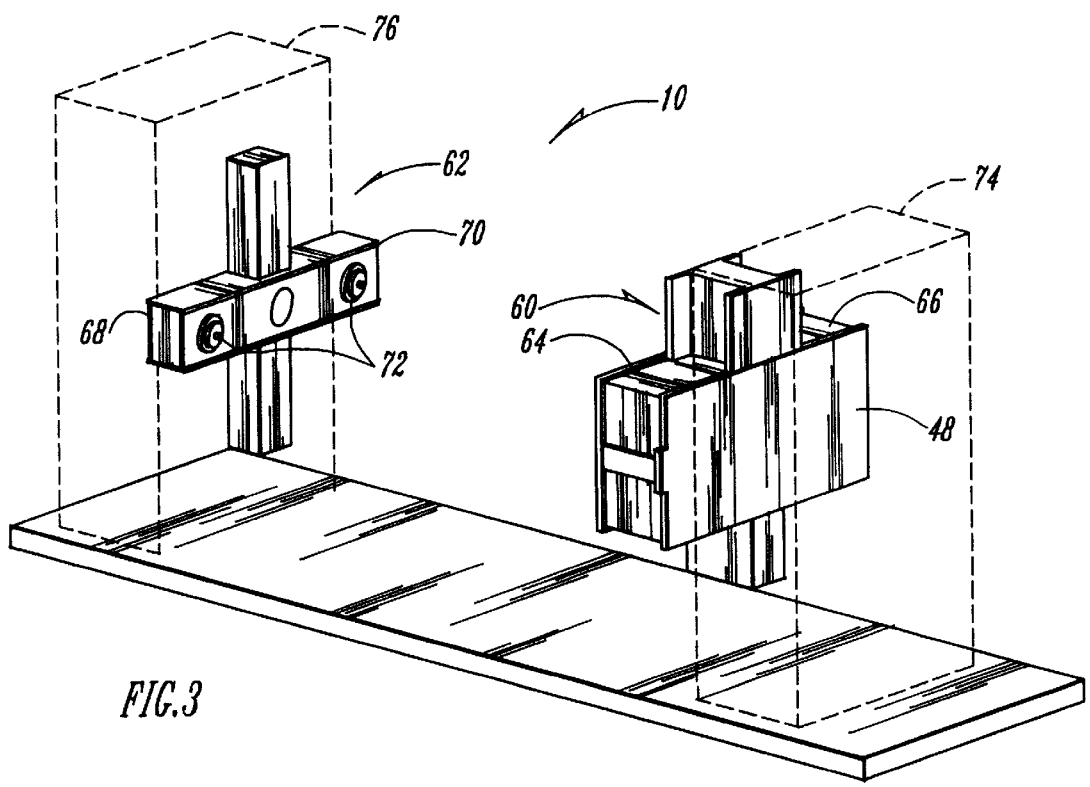
FIG. 3 is an isolated perspective view of an alternative embodiment of the workpiece positioner.
Figure 4:
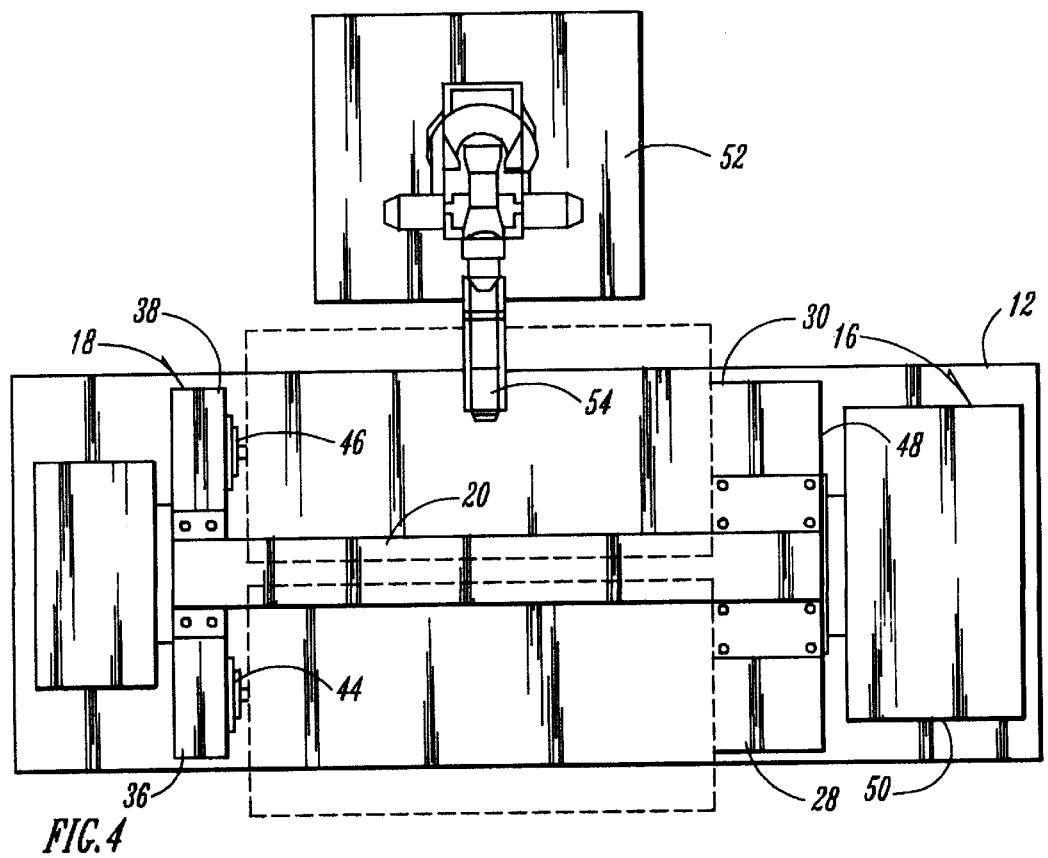
FIG. 4 is a top plan view of the workpiece positioner.

An alternative embodiment is shown in FIG. 3. This workpiece positioner 10 is also comprised of a base 12 and a workpiece positioner assembly 14. However, unlike the initial embodiment, the tie bars 20, 22 extending between the drive end 16 and the idler end 18 have been eliminated. The alternative embodiment has the same headstock end section 60 and tailstock end section 62. The workpiece is positioned therebetween as before. The headstock section 60 has a first headstock arm 64 and a second headstock arm 66. The tailstock section 62 has a first tailstock arm 68 corresponding to the first headstock arm 64, and a second tailstock arm 70 corresponding to the second headstock arm 66. A workpiece support 72 is positioned on each arm 64, 66, 68, 70, and supports a workpiece in any manner known in the prior art.

In operation, the second embodiment works in the same fashion as the first. However, because the tie bars 20, 22 are no longer present to transfer rotary motion from the drive end 16 to the idler end 18 of the assembly, the tailstock section 62 must be capable of independent movement about an exchange axis corresponding to the movement of the headstock section 60. In other words, a single workpiece positioner assembly drive means is located within main casing 50 in the first embodiment. In the second embodiment, there is a first exchange axis drive means (not shown) for the headstock section 60 located in the first casing 74 and a second drive means for rotating the tailstock section 62 about the exchange axis located in the second casing 76. The second drive means serves as the rotating means of the idler end section when the tie bars 20, 22 are removed. These two drive means (not shown) rotate the headstock 60 and tailstock 62 sections about the exchange axis in cooperation and conjunction with each other so that the motion of the headstock section 60 and the tailstock section 62 mirror each other.

A workpiece supported therebetween will be rotated about its own longitudinal axis (workpiece axis) by the drive means contained in the housing 48.

In operation, the preferred embodiment includes a headstock end side guard 80 and a tailstock end side guard 82 to prevent damage and/or injury to the flanks of the device 10.

The present invention has several other advantages and features. The device 10 has a single point for loading and unloading at a height of forty-one inches (41") as well as a robot programming height of forty-one inches (41") which is convenient to users. The main axis exchange time is as low as four seconds with weights up to 2000 pounds per side provided there is a balance within 100 pounds.

In the drawings and specification there has been set forth a preferred embodiment of the invention, and although specific terms are employed, these are used in a generic descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A workpiece positioner comprising:

a base:

a rotary workpiece holder operatively connected to said base capable of supporting at least two sets of workpiece supports and having a first end and a second end;

at least two sets of workpiece supports located on said holder, each set comprising a first support and a second support and capable of supporting a workpiece therebetween, whereby each workpiece can be supported at a first end by said first support and at a second end by said second support;

holder drive means for selectively rotating said rotary workpiece holder about a first axis;

workpiece drive means for selectively and independently rotating each workpiece about a second axis;

said rotary workpiece holder having a cross member fixed to the first holder end and the second holder end, said cross member being located substantially outside of a planar area defined by any two sets of workpiece supports.

2. The workpiece positioner of claim 1 wherein said holder further comprises a second cross member.

3. The workpiece positioner of claim 1 wherein said workpiece drive means is located adjacent said first workpiece supports for rotating said workpiece.

4. The workpiece positioner of claim 3 wherein said holder is rotatable about an axis parallel to said workpiece.

5. The workpiece positioner of claim 1 wherein said holder is substantially rectangular in shape.

6. A workpiece positioner comprising a base;

a rotary workpiece holder supported for rotational movement with respect to said base, said holder capable of supporting at least two sets of workpiece supports and having a first end and a second end and having an open framework, each set of workpiece supports capable of supporting a workpiece;

said rotary workpiece holder having a cross member fixed to the first holder end and the second holder end, said cross member being located substantially outside of a planar are defined by any two workpieces supported in said rotary workpiece holder;

holder drive means for rotating said holder around a first axis; and workpiece drive means for selectively and independently rotating each workpiece around a second axis.

7. The workpiece positioner of claim 6 wherein said workpiece drive means operates independently from said holder drive means.

8. The workpiece positioner of claim 7 wherein said workpiece drive means allows for independent movement of each workpiece.

* * * * *